US012475075B2

(12) United States Patent
Nair et al.

(10) Patent No.: US 12,475,075 B2
(45) Date of Patent: Nov. 18, 2025

(54) CIRCUITS AND METHODS FOR COHERENT WRITING TO HOST SYSTEMS (71) Applicant: Intel Corporation, Santa Clara, CA (US)

(72) Inventors: Mohan Nair, Portland, OR (US); Ishwar Agarwal, Redmond, WA (US); Ashish Gupta, San Jose, CA (US); Peeyush Purohit, Portland, OR (US); Vijay Pothi Raj Govindaraj, Hillsboro, OR (US); Nitish Paliwal, Hillsboro, OR (US); Rahul Boyapati, Portland, OR (US); Minjer Juan, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 740 days.

(21) Appl. No.: 17/692,031

(22) Filed: Mar. 10, 2022

(65) Prior Publication Data
US 2022/0197852 A1 Jun. 23, 2022

(51) Int. Cl.
*G06F 9/50* (2006.01)
*G06F 15/173* (2006.01)

(52) U.S. Cl.
CPC ...... *G06F 15/17331* (2013.01); *G06F 9/5016* (2013.01); *G06F 2212/621* (2013.01)

(58) Field of Classification Search
CPC ............. G06F 15/17331; G06F 9/5016; G06F 2212/621; G06F 15/17
USPC ........................................................ 711/100
See application file for complete search history.

(56) References Cited

U.S. PATENT DOCUMENTS

| 2014/0223071 | A1* | 8/2014 | Bert | G06F 13/28 711/103 |
| 2020/0012604 | A1* | 1/2020 | Agarwal | G06F 9/5016 |
| 2020/0050401 | A1* | 2/2020 | Gibb | G06F 3/0607 |
| 2020/0118606 | A1* | 4/2020 | Teh | G06F 13/1631 |
| 2021/0311897 | A1* | 10/2021 | Malladi | G06F 12/0802 |

* cited by examiner

*Primary Examiner* — Jared I Rutz
*Assistant Examiner* — Wei Ma
(74) *Attorney, Agent, or Firm* — InventIQ Legal LLP; Steven J. Cahill (57) ABSTRACT

A circuit system includes slow running logic circuitry that generates write data and a write command for a write request. The circuit system also includes fast running logic circuitry that receives the write data and the write command from the slow running logic circuitry. The fast running logic circuitry stores the write data and the write command. A host system generates a write response in response to receiving the write command from the fast running logic circuitry. The host system sends the write response to the fast running logic circuitry. The fast running logic circuitry sends the write data to the host system in response to receiving the write response from the host system before providing the write response to the slow running logic circuitry.

20 Claims, 4 Drawing Sheets

CIRCUITS AND METHODS FOR COHERENT WRITING TO HOST SYSTEMS

FIELD OF THE DISCLOSURE

The present disclosure relates to electronic circuit systems, and more particularly, to circuits and methods for coherent writing to host systems.

BACKGROUND

Configurable logic integrated circuits can be configured by users to implement desired custom logic functions. In a typical scenario, a logic designer uses computer-aided design tools to design a custom logic circuit. When the design process is complete, the computer-aided design tools generate configuration data. The configuration data is then loaded into configuration memory elements that configure configurable logic circuits in the integrated circuit to perform the functions of the custom logic circuit. Configurable logic integrated circuits can be used for co-processing in big-data or fast-data applications. For example, configurable logic integrated circuits may be used in application acceleration tasks in a datacenter and may be reprogrammed during datacenter operation to perform different tasks.

DETAILED DESCRIPTION

One or more specific examples are described below. In an effort to provide a concise description of these examples, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

This disclosure discusses circuit systems that can be implemented in integrated circuit devices, including programmable logic devices such as field programmable gate arrays (FPGAs). As discussed herein, circuit systems may use hard logic and soft logic of an FPGA. As used herein, "hard logic" generally refers to circuits in an integrated circuit device (e.g., a configurable integrated circuit) that are not programmable by an end user. The circuits in the integrated circuit device that are programmable by the end user are considered "soft logic."

Throughout the specification, and in the claims, the term "connected" means a direct electrical connection between the circuits that are connected, without any intermediary devices. The term "coupled" means either a direct electrical connection between circuits or an indirect electrical connection through one or more passive or active intermediary devices. The term "circuit" may mean one or more passive and/or active electrical components that are arranged to cooperate with one another to provide a desired function.

Compute Express Link (CXL) is a standard for high-speed connections between central processing units (CPUs) and external devices, such as accelerators, that is designed for high performance datacenter computers. CXL is built on the Peripheral Component Interconnect (PCI) Express physical and electrical interface with input/output, memory, and cache coherence protocols. As discussed above, a configurable logic integrated circuit, such as a field programmable gate array (FPGA), may be used in application acceleration tasks in a datacenter for a CPU. However, a CXL based coherent interface provided through an FPGA inherently has high latency and performance bottlenecks during write requests to host memory in the CPU. A CXL coherent write request from an external device to a host CPU involves a set of end-to-end round-trip handshakes to complete the write request. These round-trip handshakes introduce higher latency for write requests, especially for slower FPGA based devices. The latency may be, for example, in the order of about 300 nanoseconds. In addition, when multiple agents in an FPGA initiate write requests to host memory in the CPU, the write requests and the corresponding data from different agents may arrive in a different order. A content addressable memory (CAM) structure is typically used to manage the write requests and write data from multiple agents to avoid head of line blocking that reduces write performance.

The CXL specification allows for an agent in a device to coherently write data to a host based on write-pull semantics. During write-pull based write commands defined by the CXL specification, the slower logic circuitry in the device initially issues a coherent write command to the host (e.g., a CPU). The host then issues a write-pull response to indicate that the device may forward the write data. The write-pull response is provided to the slower logic circuitry in the device. The slower logic circuitry in the device then sends updated write data with relevant protocol information. This approach may become problematic if the device issuing the write command is running at a much slower speed than the CXL link or the host system. For example, soft logic in FPGA engines may be running 10 times slower than the high-speed CXL link used for transporting the protocol messages.

According to some examples disclosed herein, an electronic circuit system includes a host system and a device that is external to the host system. The device issues a write request (e.g., a CXL coherent write request) to write data to the host system. Slower logic circuitry in the device provides a write command and the write data for the write request to faster logic circuitry in the device. The slower logic circuitry can transfer the write data to the faster logic circuitry concurrently with the write command. The faster logic circuitry provides the write command to the host system through an external link (e.g., a CXL link). The host system responds to the write command by providing a write pull response through the external link to the device. The faster logic circuitry in the device provides the write data to the host system through the external link in response to receiving the write pull response from the host system. The faster logic circuitry in the device also provides the write response to the slower logic circuitry in the device in response to receiving the write pull response from the host system. The faster logic circuitry may use unique identifiers (e.g., identification fields or tags) to track and forward responses and the write data between the host system and the device. In response to receiving the write data from the device, the host system stores the write data in memory. This push-write flow reduces the latency of a write request substantially compared to the latency incurred by the previously known write-pull flow provided in the CXL specification.

The CXL specification has only one coherent write flow. In this flow, the device issues a write request to a host CPU. In response to the write request, the host CPU issues a write pull response to the device. Then, the device provides write data to the host CPU. This flow may be implemented with a high latency mechanism or with a low latency mechanism, which is disclosed in further detail below.

Figure 1:
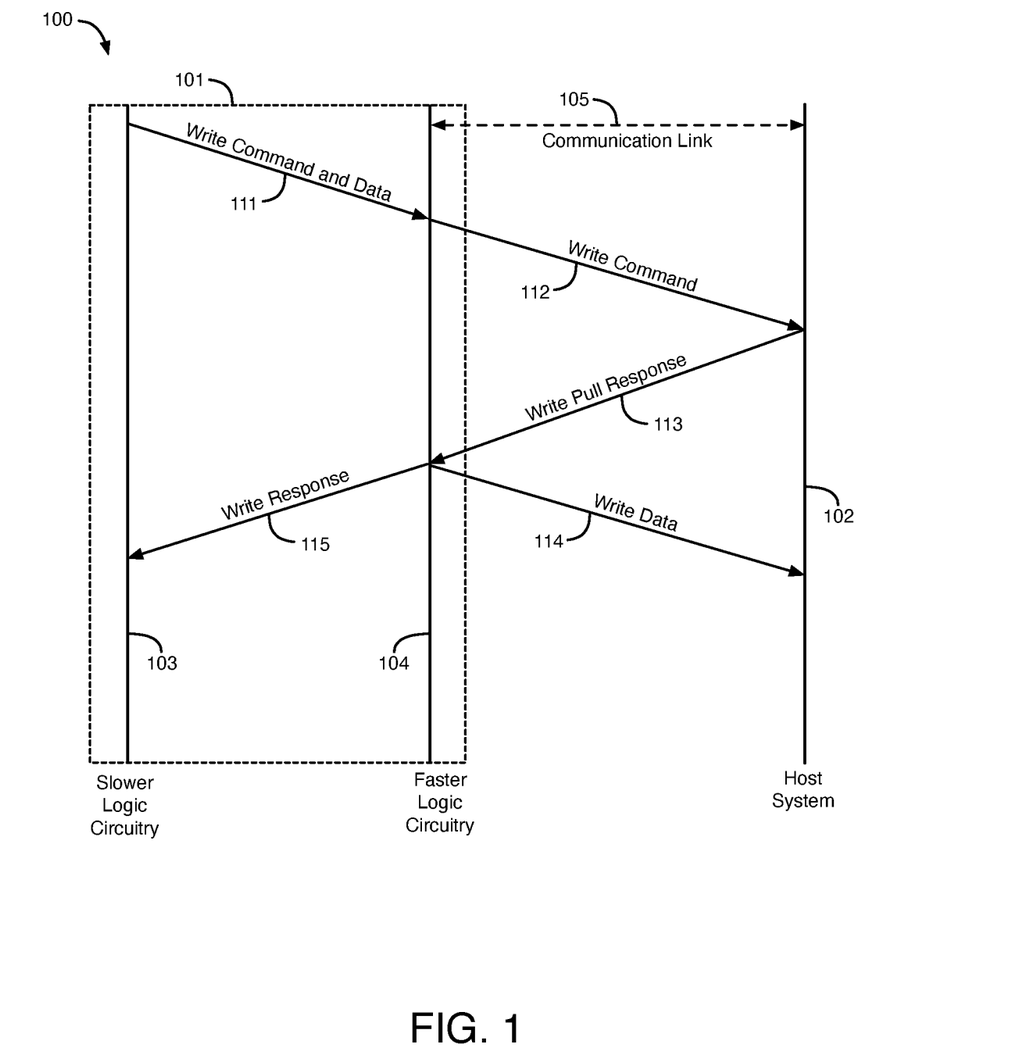
FIG. 1 is a diagram that illustrates an example of an electronic circuit system including a device that is configured to issue write requests to write data to a host system using a push-write flow.

FIG. 1 is a diagram that illustrates an example of an electronic circuit system 100 including a device 101 that is configured to issue write requests to write data to a host system 102 using a push-write flow. The circuit system 100 of Figure (FIG. 1 includes the host system 102, device 101 that is external to the host system 102, and a communication link 105 that is coupled between the host system 102 and the device 101. Device 101 may include one, two, or more integrated circuits. The integrated circuits in device 101 may, for example, include a configurable logic integrated circuit (e.g., an FPGA), a microprocessor integrated circuit (IC), or a graphics processing unit IC. Device 101 may also include, for example, a transceiver IC. The host system 102 may be, for example, a microprocessor or a central processing unit (CPU) that is provided in one or more integrated circuits.

The device 101 includes logic circuitry 103 and logic circuitry 104. Logic circuitry 103 is typically slower than logic circuitry 104. For example, logic circuitry 103 may be driven by a clock signal that has 1/10 the frequency of the clock signal that drives logic circuitry 104. Logic circuitry 103 is also referred to herein as slower logic circuitry 103 (or slow running logic circuitry), and logic circuitry 104 is also referred to herein as faster logic circuitry 104 (or fast running logic circuitry). The communication link 105 may be, for example, a type of high-speed communication link between integrated circuit devices that conforms to any communication protocol between electronic devices, such as CXL.

The circuit system 100 of FIG. 1 can perform write operations using a push-write flow. An example of a push-write flow during a write operation is now described in detail. The slower logic circuitry 103 in device 101 initially issues a write request (e.g., a CXL coherent write request) that includes a write command with write data to the faster logic circuitry 104, as shown by arrow 111 in FIG. 1, according to the push-write flow. In response to receiving the write command from the slower logic circuitry 103, the faster logic circuitry 104 uses unique tag values and remapping schemes to issue the write command to the host system 102 without forwarding the write data. The faster logic circuitry 104 transmits the write command without the write data to the host system 102 through the communication link 105, as shown by arrow 112. The faster logic circuitry 104 stores the write data received from the slower logic circuitry 103 (e.g., in a buffer), until a write pull response is received from the host system 102.

In response to receiving the write command from the faster logic circuitry 104, the host system 102 responds back with a write pull response message (e.g., in accordance with the CXL specification), as shown by arrow 113 in FIG. 1. The host system 102 transmits the write pull response message through the communication link 105 to the faster logic circuitry 104. In response to receiving the write pull response from the host system 102, the faster logic circuitry 104 transmits the write data to the host system 102 through communication link 105, as shown by arrow 114. The write data that the faster logic circuitry 104 transmits to the host system 102 through communication link 105 is the same write data that was previously received from the slower logic circuitry 103 (as shown by arrow 111) and stored in the faster logic circuitry 104.

Also, in response to receiving the write pull response from the host system 102 (as shown by arrow 113), the faster logic circuitry 104 transmits a write response to the slower logic circuitry 103, as shown by arrow 115. The write response provided to the slower logic circuitry 103 indicates to the slower logic circuitry 103 that the write request has been completed. According to a specific example, the faster logic circuitry 104 spoofs the behavior required by a protocol for the communication link 105 (e.g., the CXL specification) with regards to the transmission of write data between the slower logic circuitry 103 and the host system 102, without breaking protocol level flows. The host system 102 may, for example, operate at a much higher clock frequency than the slower logic circuitry 103. The circuit system 100 of FIG. 1 substantially reduces the latency of a write request to the host system 102 (e.g., by one-third) compared to the previously known write-pull flow, because the slower logic circuitry 103 transmits the write data to the faster logic circuitry 104 (arrow 111) before receiving the write response from the faster logic circuitry 104 (arrow 115).

Figure 2:
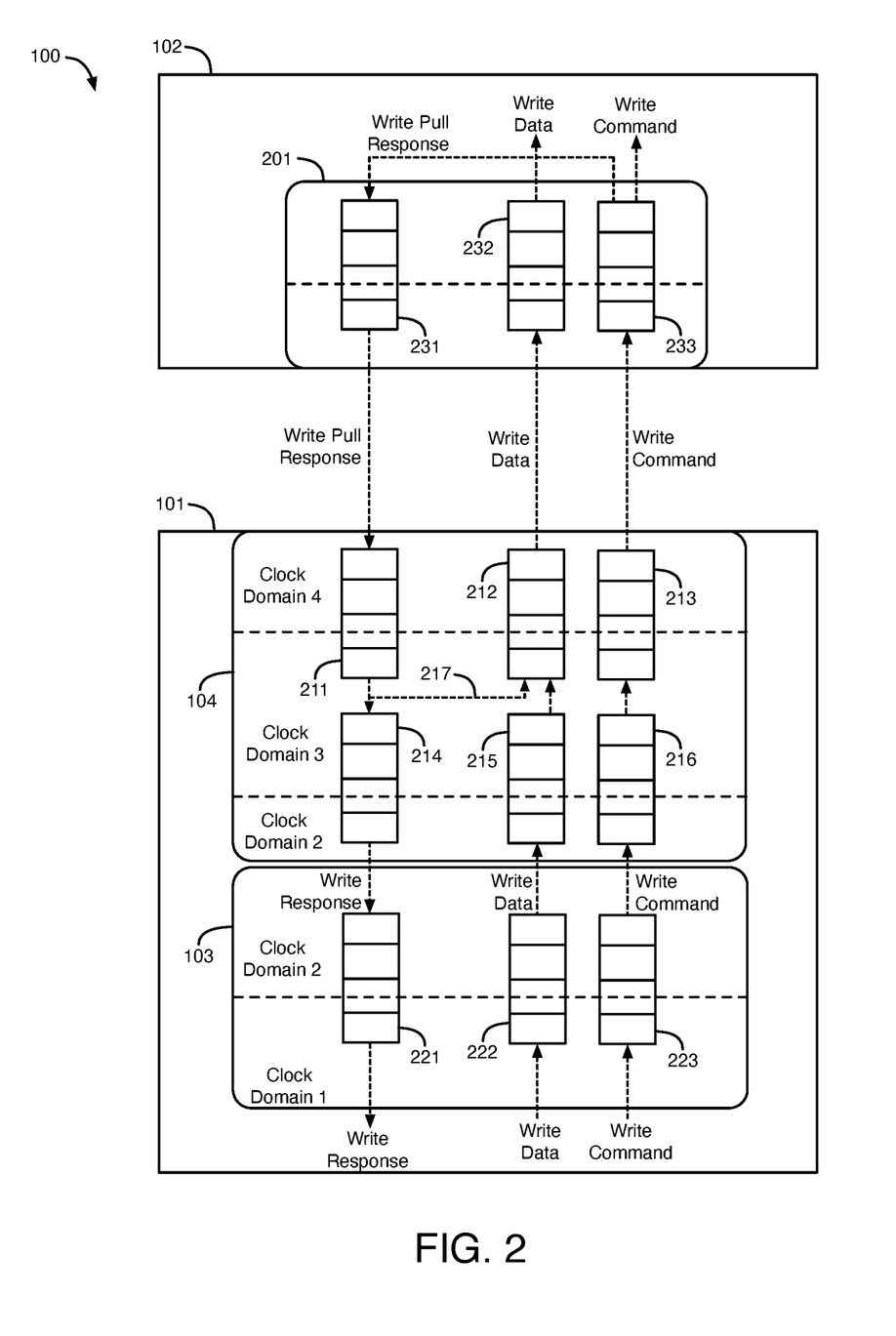
FIG. 2 is a diagram that illustrates details of an exemplary implementation of the electronic circuit system of FIG. 1 that provides write data to the host system before providing a write response to the logic circuitry issuing a write request.

FIG. 2 is a diagram that illustrates details of an exemplary implementation of the electronic circuit system 100 of FIG. 1. In the example of FIG. 2, the host system 102 has an interface circuit 201 that includes three buffer circuits 231, 232, and 233. The faster logic circuitry 104 in device 101 includes 6 buffer circuits 211, 212, 213, 214, 215, and 216. The slower logic circuitry 103 in device 101 includes 3 buffer circuits 221, 222, and 223. As an example, the buffer circuits 211-216, 221-223, and 231-233 may be first-in-first-out (FIFO) buffer circuits. Each of FIFO buffer circuits 211-216, 221-223, and 231-233 may transmit write data or write commands from a first clock domain clocked by a first clock signal to a second clock domain clocked by a second clock signal.

According to a specific example of circuit system 100, device 101 may be an integrated circuit (IC) package that houses a configurable IC die (e.g., an FPGA) that contains the slower logic circuitry 103 and a transceiver IC die that contains the faster logic circuitry 104. In this example, the slower logic circuitry 103 may be implemented in soft logic (e.g., programmable logic circuits) or in hard logic in the configurable IC.

During a write operation, the circuit system 100 shown in FIG. 2 performs a push-write flow, as is now described in detail. Initially, a write command and write data for a write request is generated by a requesting agent. The write command is provided to and stored in buffer circuit 223 in logic circuitry 103, and the write data is provided to and stored in buffer circuit 222 in logic circuitry 103. Buffer circuit 222 transfers the write data from a first clock domain (clock domain 1) to a second clock domain (clock domain 2), and buffer circuit 223 transfers the write command from clock domain 1 to clock domain 2. The circuits in clock domain 2 are driven by a clock signal that has a higher frequency than the frequency of the clock signal that drives the circuits in clock domain 1. The write command is transferred from buffer circuit 223 to buffer circuit 216 in logic circuitry 104, and the write data is transferred from buffer circuit 222 to buffer circuit 215 in logic circuitry 104. Buffer circuit 215 transfers the write data from clock domain 2 to a third clock domain (clock domain 3), and buffer circuit 216 transfers the write command from clock domain 2 to clock domain 3. The circuits in clock domain 3 are driven by a clock signal that has a higher frequency than the frequency of the clock signal that drives the circuits in clock domain 2.

The write command is transferred from buffer circuit 216 to buffer circuit 213, and the write data is transferred from buffer circuit 215 to buffer circuit 212. Buffer circuit 212 transfers the write data from clock domain 3 to a fourth clock domain (clock domain 4), and buffer circuit 213 transfers the write command from clock domain 3 to clock domain 4. The circuits in clock domain 4 are driven by a clock signal that has a higher frequency than the frequency of the clock signal that drives the circuits in clock domain 3.

The write command is then transmitted from buffer circuit 213 through a communication link to buffer circuit 233 in host system 102. Buffer circuit 233 may, for example, transfer the write command from clock domain 4 to another clock domain in host system 102. In response to receiving the write command from device 101, host system 102 generates a write pull response. Host system 102 stores the write pull response in buffer circuit 231. Buffer circuit 231 may transfer the write pull response to clock domain 4 in host system 102.

The write pull response is then transmitted from the buffer circuit 231 through the communications link to the buffer circuit 211 in logic circuitry 104 in device 101. Buffer circuit 211 then stores the write pull response. Buffer circuit 211 transfers the write pull response from clock domain 4 to clock domain 3. The write pull response (or a signal indicating the write pull response) is then transferred from buffer circuit 211 to buffer circuit 212 via path 217. In response to receiving the write pull response (or this signal) at buffer circuit 212 via path 217, logic circuitry 104 transmits the write data stored in buffer circuit 212 through the communication link to buffer circuit 232 in host system 102. Buffer circuit 232 stores the write data and transfers the write data from clock domain 4 to the other clock domain in host system 102. The write data and the write command are then transferred to memory in host system 102 to perform the write operation.

The total latency of the write request is the sum of the delay to transmit the write command from buffer circuit 223 to buffer circuit 233, plus the delay to generate and store the write pull response and transmit the write pull response from buffer circuit 231 to buffer circuit 211, plus the delay to transmit the signal indicating the write pull response through path 217, plus the delay to transmit the write data from buffer circuit 212 to buffer circuit 232. As a specific example that is not intended to be limiting, the total latency of the write request may be 100 nanoseconds. By providing a signal indicating the write pull response from buffer circuit 211 to buffer circuit 212 via path 217, the latency of the write request is substantially reduced, because logic circuitry 104 operates at a higher frequency than logic circuitry 103, and the write pull response is not transferred through buffer circuits 214 and 221.

The write pull response is also transferred from buffer circuit 211 to buffer circuit 214. The write pull response is stored in buffer circuit 214. Buffer circuit 214 transfers the write pull response from clock domain 3 to clock domain 2. Buffer circuit 214 transfers the write pull response as a write response to buffer circuit 221 in logic circuitry 103. Buffer circuit 221 stores the write response and transfers the write response from clock domain 2 to clock domain 1. Buffer circuit 221 outputs the write response to the requesting agent.

Figure 3:
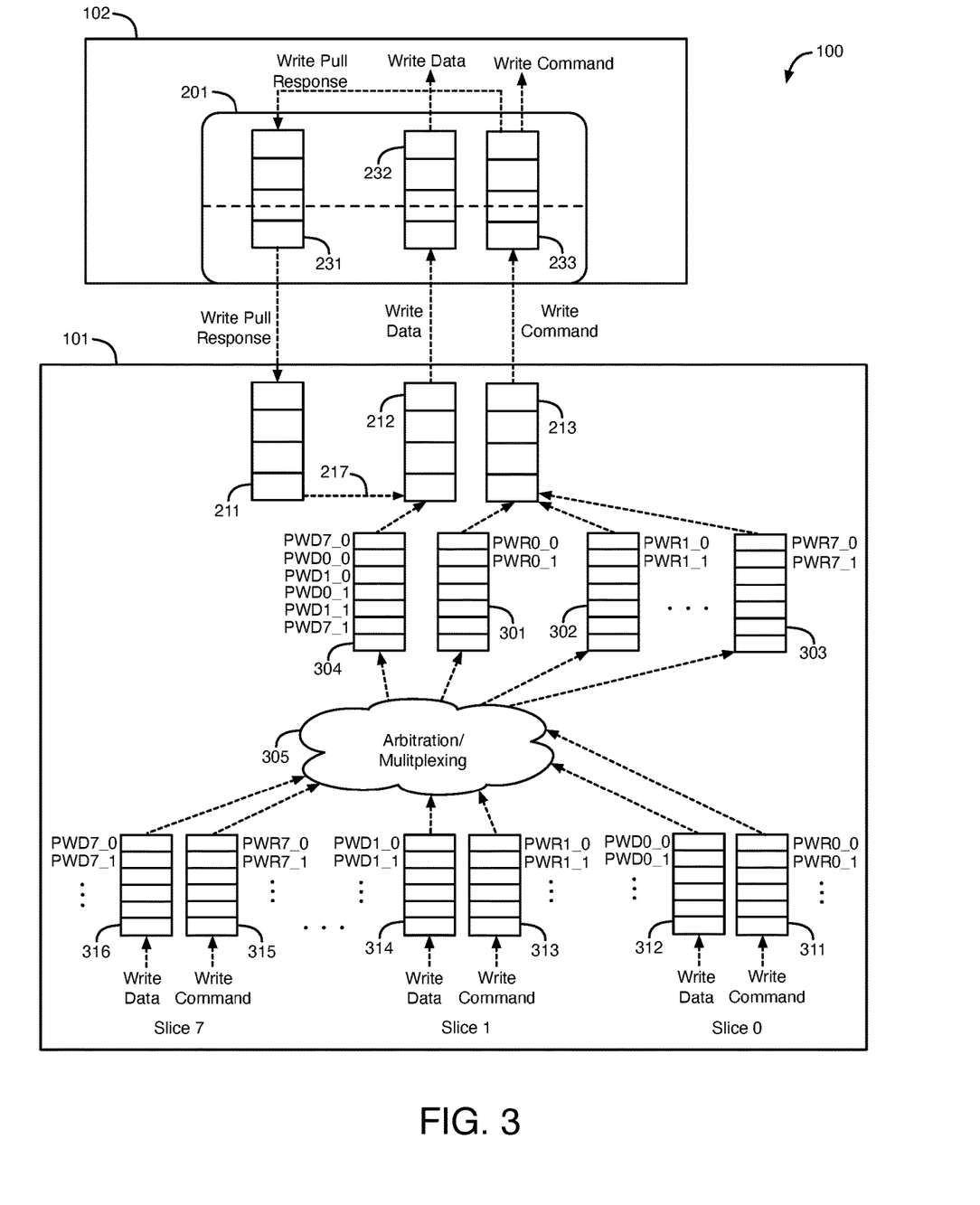
FIG. 3 is a diagram that illustrates details of another exemplary implementation of the electronic circuit system of FIG. 1 that stores write data from multiple requesting agents in the same buffer circuit.

FIG. 3 is a diagram that illustrates details of another exemplary implementation of the electronic circuit system 100 of FIG. 1. As with the example of FIG. 2, the host system 102 of FIG. 3 has an interface circuit 201 that includes the three buffer circuits 231, 232, and 233. Device 101 in FIG. 3 includes buffer circuits 211, 212, 213, 301, 302, 303, 304, 311, 312, 313, 314, 315, and 316. As an example, the buffer circuits 211-213, 301-304, 311-316, and 231-233 may be first-in-first-out (FIFO) buffer circuits. Each of the FIFO buffer circuits 211-213, 301-304, 311-316, and 231-233 may transmit write date or write commands from one clock domain clocked by a first clock signal to a second clock domain clocked by a second clock signal. Device 101 also includes arbitration and multiplexing circuitry 305. As a specific example, buffer circuits 311-316 may be in logic circuitry 103, buffer circuits 301-304 may be in logic circuitry 104, and arbitration and multiplexing circuitry 305 may be in logic circuitry 103 or 104.

As discussed above, when multiple agents initiate write requests to a host system, the write requests and the corresponding data from different agents may arrive in a different order. As a result, the write requests cannot make forward progress. A CAM structure is typically used to manage the write requests and write data to avoid head of line blocking that reduces write performance. The system of FIG. 3 provides a mechanism that avoids head of line blocking without having to use a CAM structure. The circuitry shown in device 101 in FIG. 3 uses a unique identifier for each agent that generates a write request. Each write request includes write data and a write command. Each of the write commands and write data from an agent are assigned to a unique identifier that identifies the agent. The write commands are pushed into the queues of different receiving buffer circuits, such as buffer circuits 301-303, and the write data from multiple agents are pushed into the queue of a single buffer circuit 304.

In FIG. 3, the agents that generate write requests are referred to as slices. As an example that is not intended to be limiting, the circuitry shown in FIG. 3 in device 101 may include 8 slices. Three of these 8 slices are shown in FIG. 3 as slice 0, slice 1, and slice 7, as examples. Each of the 8 slices in device 101 may generate one or more write requests to write data to memory in host system 102. Each of the write requests includes write data and a write command. The slices provide the write data and the write commands for the write requests to buffer circuits in device 101. For example, slices 0, 1, and 7 provide write commands for three write requests to buffer circuits 311, 313, and 315, respectively. The write commands from slices 0, 1, and 7 are stored in buffer circuits 311, 313, and 315, respectively. Slices 0, 1, and 7 provide write data for these three write requests to buffer circuits 312, 314, and 316, respectively. The write data from slices 0, 1, and 7 are stored in buffer circuits 312, 314, and 316, respectively.

The write commands stored in buffer circuits 311, 313, and 315 and the write data stored in buffer circuits 312, 314, and 316 for the write requests are provided to arbitration and multiplexing circuitry 305. Arbitration and multiplexing circuitry 305 provides the write data for each of the write requests generated by each of the slices to buffer circuit 304. The write data for each of the write requests generated by each of the slices are stored in buffer circuit 304. For example, the write data from buffer circuits 312, 314, and 316 are provided to and stored in buffer circuit 304. Arbitration and multiplexing circuitry 305 provides the write data for the write requests to buffer circuit 304 in the order in which the write data is received from buffer circuits 312, 314, and 316. The write data for different write requests are stored in different entries in buffer circuit 304.

The write data for each write request stored in buffer circuit 304 is associated with a unique identifier that identifies the slice that generated the write data. The unique identifiers allow the device 101 to correspond the write data for each write request that is stored in buffer circuit 304 with a corresponding write command stored in one of buffer circuits 301-303 for the same write request. Arbitration and multiplexing circuitry 305 may provide the unique identifiers for the write data to buffer circuit 304. The unique identifier associated with the write data for each write request may be stored in buffer circuit 304 with the write data. The write data stored in buffer circuit 304 for each of the write requests is then provided to and stored in buffer circuit 212.

Arbitration and multiplexing circuitry 305 provides the write commands for the write requests to other buffer circuits, including buffer circuits 301-303. The write commands from each of the 8 slices are provided to and stored in a different buffer circuit. The arbitration and multiplexing circuitry 305 selects the buffer circuit (e.g., one of buffer circuits 301-303) to store each of the write commands based on the unique identifier associated with each write command. The unique identifier associated with each write command identifies the slice that generated the write command. For example, arbitration and multiplexing circuitry 305 provides the write commands from buffer circuit 311 to buffer circuit 301 based on these write commands being associated with identifiers for slice 0. The write commands from buffer circuit 311 are stored in buffer circuit 301. Arbitration and multiplexing circuitry 305 provides the write commands from buffer circuit 313 to buffer circuit 302 based on these write commands being associated with identifiers for slice 1. The write commands from buffer circuit 313 are stored in buffer circuit 302. Arbitration and multiplexing circuitry 305 provides the write commands from buffer circuit 315 to buffer circuit 303 based on these write commands being associated with identifiers for slice 7. The write commands from buffer circuit 315 are stored in buffer circuit 303. The write commands for different write requests are stored in different entries in buffer circuits 301-303. The identifiers associated with the write commands may also be stored in buffer circuits 301-303.

Each of the write commands stored in buffer circuits 301-303 is provided to buffer circuit 213. The write command for each write request is then provided to host system 102, as described above with respect to FIG. 2. The write pull response received from host system 102 for each write request is stored in buffer circuit 211, and then a signal indicating receipt of the write pull response is provided to buffer circuit 212 through path 217. In response to receiving the signal indicating receipt of the write pull response for a write request via path 217, buffer circuit 212 provides the write data for the write request to host system 102, as described above with respect to FIG. 2.

According to a specific example shown in FIG. 3, write commands PWR0_0 and PWR0_1 are generated by slice 0, stored in buffer circuit 311, provided to buffer circuit 301 by arbitration and multiplexing circuitry 305, and stored in buffer circuit 301 with based on the identifiers for slice 0. Write commands PWR1_0 and PWR1_1 are generated by slice 1, stored in buffer circuit 313, provided to buffer circuit 302 by arbitration and multiplexing circuitry 305, and stored in buffer circuit 302 based on the identifiers for slice 1. Write commands PWR7_0 and PWR7_1 are generated by slice 7, stored in buffer circuit 315, provided to buffer circuit 303 by arbitration and multiplexing circuitry 305, and stored in buffer circuit 303 based on the identifiers for slice 7.

According to this example, slice 0 generates write data PWD0_0 and PWD0_1 that correspond to write commands PWR0_0 and PWR0_1, respectively. Slice 0 stores the write data PWD0_0 and PWD0_1 in buffer circuit 312. Arbitration and multiplexing circuitry 305 provides write data PWD0_0 and PWD0_1 from buffer circuit 312 to buffer circuit 304. Slice 1 generates write data PWD1_0 and PWD1_1 that correspond to write commands PWR1_0 and PWR1_1, respectively. Slice 1 stores the write data PWD1_0 and PWD1_1 in buffer circuit 314. Arbitration and multiplexing circuitry 305 provides write data PWD1_0 and PWD1_1 from buffer circuit 314 to buffer circuit 304. Slice 7 generates write data PWD7_0 and PWD7_1 that correspond to write commands PWR7_0 and PWR7_1, respectively. Slice 7 stores the write data PWD7_0 and PWD7_1 in buffer circuit 316. Arbitration and multiplexing circuitry 305 provides write data PWD7_0 and PWD7_1 from buffer circuit 316 to buffer circuit 304.

Buffer circuit 304 stores the write data for the write requests in the order in which the write data is received from the arbitration and multiplexing circuitry 305 (e.g., in a first-in-first-out manner). In the example shown in FIG. 3, buffer circuit 304 stores the write data in the order of PWD7_0, PWD0_0, PWD1_0, PWD0_1, PWD1_1, and PWD7_1. The write data and the write command for each write request are associated with a unique identifier identifying the requesting slice/agent. Device 101 uses the unique identifiers to correspond the write data for each write request stored in buffer circuit 304 with a corresponding write command stored in one of buffer circuits 301-303 for the same write request. Using the unique identifiers, device 101 can provide the write data and the write command for the same write request to the host system 102 concurrently, so that the host system 102 can process the write data and the corresponding write command for the write request to perform the write operation.

Figure 4:
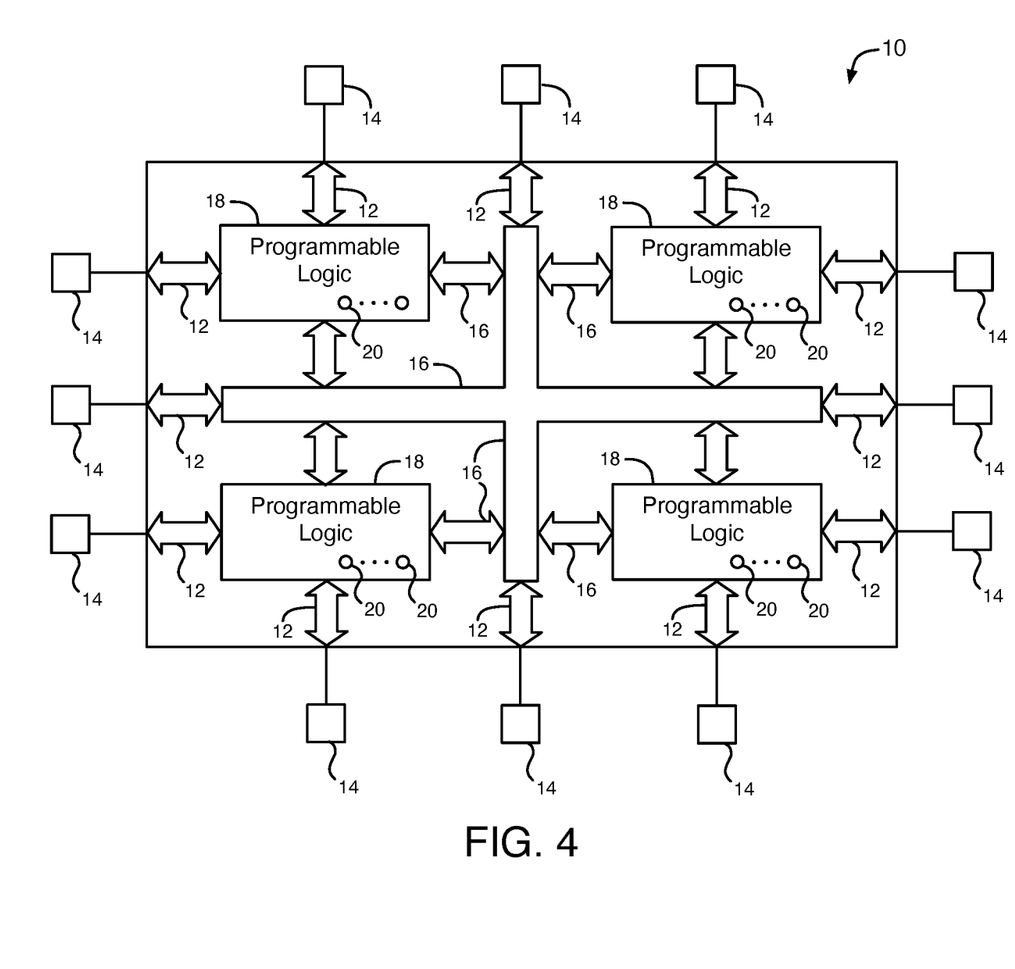
FIG. 4 is a diagram of an illustrative programmable logic integrated circuit (IC) that may be an example of the slower logic circuitry of FIGS. 1-3.

FIG. 4 is a diagram of an illustrative programmable (i.e., configurable) logic integrated circuit (IC) 10 that is an example of the slower logic circuitry 103 of FIGS. 1-3. As shown in FIG. 4, programmable logic integrated circuit 10 may have input-output circuitry 12 for driving signals off of IC 10 and for receiving signals from other devices via input-output pads 14. Interconnection resources 16 such as global, regional, and local vertical and horizontal conductive lines and buses may be used to route signals on IC 10. Interconnection resources 16 include fixed interconnects (conductive lines) and programmable interconnects (i.e., programmable connections between respective fixed interconnects). Programmable logic circuitry 18 may include combinational and sequential logic circuitry. The programmable logic circuitry 18 may be configured to perform custom logic functions. One or more portions of the programmable logic circuitry 18 may be configured as the slower logic circuitry 103, as disclosed herein with respect to FIGS. 1-3.

Programmable logic IC 10 contains memory elements 20 that can be loaded with configuration data using pads 14 and input-output circuitry 12. Once loaded, the memory elements 20 may each provide a corresponding static control output signal that controls the state of an associated logic component in programmable logic circuitry 18. Typically, the memory element output signals are used to control the gates of metal-oxide-semiconductor (MOS) transistors. In the context of programmable integrated circuits, the memory elements 20 store configuration data and are sometimes referred to as configuration random-access memory (CRAM) cells.

In general, software and data for performing any of the functions disclosed herein, including the functions performed in device 101 and in host system 102, may be stored in non-transitory computer readable storage media. Non-transitory computer readable storage media is tangible computer readable storage media that stores data for a significant period of time, as opposed to media that only transmits propagating electrical signals (e.g., wires). The software code may sometimes be referred to as software, data, program instructions, instructions, or code. The non-transitory computer readable storage media may include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

Additional examples are now disclosed. Example 1 is a circuit system comprising: first logic circuitry that generates write data and a write command for a write request; second logic circuitry that receives the write data and the write command from the first logic circuitry, wherein the second logic circuitry stores the write data and the write command; and a host system that generates a write response in response to receiving the write command from the second logic circuitry, wherein the host system sends the write response to the second logic circuitry, and wherein the second logic circuitry sends the write data to the host system in response to receiving the write response from the host system before providing the write response to the first logic circuitry.

In Example 2, the circuit system of Example 1 may optionally include, wherein the second logic circuitry comprises a first buffer circuit that stores the write data, a second buffer circuit that stores the write command, and a third buffer circuit that stores the write response received from the host system, and wherein the write data is provided from the first buffer circuit to the host system in response to a signal indicative of the write response being provided from the third buffer circuit to the first buffer circuit before the write response is provided to the first logic circuitry.

In Example 3, the circuit system of Example 2 may optionally include, wherein the first logic circuitry comprises a fourth buffer circuit that stores the write data and a fifth buffer circuit that stores the write command, and wherein the host system comprises a sixth buffer circuit that stores the write data and a seventh buffer circuit that stores the write command.

In Example 4, the circuit system of Example 2 may optionally include, wherein the first buffer circuit stores the write data and additional write data for an additional write request, and wherein the second logic circuitry comprises a fourth buffer circuit that stores an additional write command for the additional write request.

In Example 5, the circuit system of any one of Examples 2-4 may optionally include, wherein the first buffer circuit transfers the write data from a first clock domain to a second clock domain, wherein the second buffer circuit transfers the write command from the first clock domain to the second clock domain, and wherein the third buffer circuit transfers the write response from the second clock domain to the first clock domain.

In Example 6, the circuit system of any one of Examples 1-5 may optionally include, wherein the host system performs a write operation using the write command and the write data received from the second logic circuitry, wherein the write response is provided to the first logic circuitry from the second logic circuitry, and wherein the first logic circuitry is driven by a clock signal that has a frequency that is less than a frequency of a clock signal that drives the second logic circuitry.

In Example 7, the circuit system of Example 1 may optionally include, wherein the second logic circuitry comprises first, second, and third buffer circuits and arbitration and multiplexing circuitry that provides the write data generated from a first agent and a first identifier of the first agent to the first buffer circuit, wherein the arbitration and multiplexing circuitry provides the write command and the first identifier to the second buffer circuit, wherein the arbitration and multiplexing circuitry provides additional write data generated by a second agent for an additional write request and a second identifier of the second agent to the first buffer circuit, and wherein the arbitration and multiplexing circuitry provides an additional write command for the additional write request and the second identifier to the third buffer circuit.

Example 8 is a circuit system comprising: first, second, and third buffer circuits; and arbitration and multiplexing circuitry that provides first write data generated from a first agent for a first write request and a first identifier of the first agent to the first buffer circuit, wherein the arbitration and multiplexing circuitry provides a first write command for the first write request and the first identifier to the second buffer circuit, wherein the arbitration and multiplexing circuitry provides second write data generated by a second agent for a second write request and a second identifier of the second agent to the first buffer circuit, and wherein the arbitration and multiplexing circuitry provides a second write command for the second write request and the second identifier to the third buffer circuit.

In Example 9, the circuit system of Example 8 may further comprise: a fourth buffer circuit that stores the first write data, wherein the first write data is provided from the fourth buffer circuit to the arbitration and multiplexing circuitry; a fifth buffer circuit that stores the first write command, wherein the first write command is provided from the fifth buffer circuit to the arbitration and multiplexing circuitry; a sixth buffer circuit that stores the second write data, wherein the second write data is provided from the sixth buffer circuit to the arbitration and multiplexing circuitry; and a seventh buffer circuit that stores the second write command, wherein the second write command is provided from the seventh buffer circuit to the arbitration and multiplexing circuitry.

In Example 10, the circuit system of Example 8 may further comprise: fourth and fifth buffer circuits, wherein the first write data and the second write data are provided from the first buffer circuit to the fourth buffer circuit, wherein the first write command is provided from the second buffer circuit to the fifth buffer circuit, and wherein the second write command is provided from the third buffer circuit to the fifth buffer circuit.

In Example 11, the circuit system of Example 8 may further comprise: a fourth buffer circuit, wherein the arbitration and multiplexing circuitry provides third write data generated by a third agent for a third write request and a third identifier of the third agent to the first buffer circuit, and wherein the arbitration and multiplexing circuitry provides a third write command for the third write request and the third identifier to the fourth buffer circuit.

In Example 12, the circuit system of any one of Examples 8-11 may optionally include, wherein the circuit system provides the first write data and the first write command to a host system concurrently based on the first write data and the first write command being associated with the first identifier, and wherein the circuit system provides the second write data and the second write command to the host system concurrently based on the second write data and the second write command being associated with the second identifier.

In Example 13, the circuit system of any one of Examples 8-12 may optionally include, wherein the first buffer circuit is a first first-in-first-out buffer circuit that stores the first and the second write data in an order received from the arbitration and multiplexing circuitry.

In Example 14, the circuit system of Example 13 may optionally include, wherein the second buffer circuit is a second first-in-first-out buffer circuit that stores the first write command and a third write command from the first agent in an order received from the arbitration and multiplexing circuitry, and wherein the third buffer circuit is a third first-in-first-out buffer circuit that stores the second write command and a fourth write command from the second agent in an order received from the arbitration and multiplexing circuitry.

Example 15 is a method for providing a write request to a host system, the method comprising: generating write data and a write command for the write request at first logic circuitry; storing the write data and the write command received from the first logic circuitry in second logic circuitry; generating a write response at the host system in response to receiving the write command from the second logic circuitry; providing the write response from the host system to the second logic circuitry; and providing the write data from the second logic circuitry to the host system in response to receiving the write response from the host system before providing the write response to the first logic circuitry.

In Example 16, the method of Example 15 may further comprise: performing a write operation at the host system using the write command and the write data received from the second logic circuitry.

In Example 17, the method of any one of Examples 15-16 may optionally include, wherein storing the write data and the write command received from the first logic circuitry in the second logic circuitry further comprises storing the write data in a first buffer circuit in the second logic circuitry, and wherein providing the write data from the second logic circuitry to the host system further comprises providing a signal indicative of receipt of the write response from a second buffer circuit in the second logic circuitry to the first buffer circuit, and providing the write data from the first buffer circuit to the host system in response to receiving the signal at the first buffer circuit.

In Example 18, the method of any one of Examples 15-16 may optionally include, wherein storing the write data and the write command received from the first logic circuitry in second logic circuitry further comprises: providing the write data generated from a first agent and a first identifier of the first agent to a first buffer circuit with arbitration and multiplexing circuitry; and providing the write command and the first identifier to a second buffer circuit with the arbitration and multiplexing circuitry.

In Example 19, the method of Example 18 may further comprise: providing additional write data generated by a second agent for an additional write request and a second identifier of the second agent to the first buffer circuit with the arbitration and multiplexing circuitry; and providing an additional write command for the additional write request and the second identifier to a third buffer circuit with the arbitration and multiplexing circuitry.

In Example 20, the method of any one of Examples 15-19 may further comprise: storing the write response in the second logic circuitry; providing the write response from the second logic circuitry to the first logic circuitry after providing the write data from the second logic circuitry to the host system; and storing the write response in the first logic circuitry.

In Example 21, the method of any one of Examples 15-20 may optionally include, wherein the first logic circuitry is driven by a clock signal that has a frequency that is less than a frequency of a clock signal that drives the second logic circuitry.

It will be recognized by one skilled in the art, that the examples disclosed herein may be practiced without some or all of these specific details. In other instances, well-known operations have not been described in detail in order not to obscure the present examples. It should be appreciated that the examples disclosed herein can be implemented in numerous ways, such as a process, an apparatus, a system, a device, or a method on a computer readable medium.

The foregoing description of the examples has been presented for the purpose of illustration. The foregoing description is not intended to be exhaustive or to be limiting to the examples disclosed herein. In some instances, features of the examples can be employed without a corresponding use of other features as set forth. Many modifications, substitutions, and variations are possible in light of the above teachings.

What is claimed is:

1. A circuit system comprising:
    first logic circuitry that generates write data and a write command for a write request;
    second logic circuitry that receives the write data and the write command from the first logic circuitry, wherein the second logic circuitry stores the write data and the write command; and
    a host system that generates a write response in response to receiving the write command from the second logic circuitry, wherein the host system sends the write response to the second logic circuitry, and wherein the second logic circuitry sends the write data to the host system in response to receiving the write response from the host system before providing the write response to the first logic circuitry.

2. The circuit system of claim 1, wherein the second logic circuitry comprises a first buffer circuit that stores the write data, a second buffer circuit that stores the write command, and a third buffer circuit that stores the write response received from the host system, and wherein the write data is provided from the first buffer circuit to the host system in response to a signal indicative of the write response being provided from the third buffer circuit to the first buffer circuit before the write response is provided to the first logic circuitry.

3. The circuit system of claim 2, wherein the first logic circuitry comprises a fourth buffer circuit that stores the write data and a fifth buffer circuit that stores the write command, and wherein the host system comprises a sixth buffer circuit that stores the write data and a seventh buffer circuit that stores the write command.

4. The circuit system of claim 2, wherein the first buffer circuit stores the write data and additional write data for an additional write request, and wherein the second logic circuitry comprises a fourth buffer circuit that stores an additional write command for the additional write request.

5. The circuit system of claim 2, wherein the first buffer circuit transfers the write data from a first clock domain to a second clock domain, wherein the second buffer circuit transfers the write command from the first clock domain to the second clock domain, and wherein the third buffer circuit transfers the write response from the second clock domain to the first clock domain.

6. The circuit system of claim 1, wherein the host system performs a write operation using the write command and the write data received from the second logic circuitry, wherein the write response is provided to the first logic circuitry from the second logic circuitry, and wherein the first logic circuitry is driven by a clock signal that has a frequency that is less than a frequency of a clock signal that drives the second logic circuitry.

7. The circuit system of claim 1, wherein the second logic circuitry comprises first, second, and third buffer circuits and arbitration and multiplexing circuitry that provides the write data generated from a first agent and a first identifier of the first agent to the first buffer circuit, wherein the arbitration and multiplexing circuitry provides the write command and the first identifier to the second buffer circuit,
  wherein the arbitration and multiplexing circuitry provides additional write data generated by a second agent for an additional write request and a second identifier of the second agent to the first buffer circuit, and wherein the arbitration and multiplexing circuitry provides an additional write command for the additional write request and the second identifier to the third buffer circuit.

8. A circuit system comprising:
first, second, and third buffer circuits; and
arbitration and multiplexing circuitry that provides first write data generated from a first agent for a first write request and a first identifier of the first agent to the first buffer circuit, wherein the arbitration and multiplexing circuitry provides a first write command for the first write request and the first identifier to the second buffer circuit,
  wherein the arbitration and multiplexing circuitry provides second write data generated by a second agent for a second write request and a second identifier of the second agent to the first buffer circuit, and wherein the arbitration and multiplexing circuitry provides a second write command for the second write request and the second identifier to the third buffer circuit.

9. The circuit system of claim 8 further comprising:
a fourth buffer circuit that stores the first write data, wherein the first write data is provided from the fourth buffer circuit to the arbitration and multiplexing circuitry;
a fifth buffer circuit that stores the first write command, wherein the first write command is provided from the fifth buffer circuit to the arbitration and multiplexing circuitry;
a sixth buffer circuit that stores the second write data, wherein the second write data is provided from the sixth buffer circuit to the arbitration and multiplexing circuitry; and
a seventh buffer circuit that stores the second write command, wherein the second write command is provided from the seventh buffer circuit to the arbitration and multiplexing circuitry.

10. The circuit system of claim 8 further comprising:
fourth and fifth buffer circuits, wherein the first write data and the second write data are provided from the first buffer circuit to the fourth buffer circuit, wherein the first write command is provided from the second buffer circuit to the fifth buffer circuit, and wherein the second write command is provided from the third buffer circuit to the fifth buffer circuit.

11. The circuit system of claim 8 further comprising:
a fourth buffer circuit, wherein the arbitration and multiplexing circuitry provides third write data generated by a third agent for a third write request and a third identifier of the third agent to the first buffer circuit, and wherein the arbitration and multiplexing circuitry provides a third write command for the third write request and the third identifier to the fourth buffer circuit.

12. The circuit system of claim 8, wherein the circuit system provides the first write data and the first write command to a host system concurrently based on the first write data and the first write command being associated with the first identifier, and wherein the circuit system provides the second write data and the second write command to the host system concurrently based on the second write data and the second write command being associated with the second identifier.

13. The circuit system of claim 8, wherein the first buffer circuit is a first first-in-first-out buffer circuit that stores the first and the second write data in an order received from the arbitration and multiplexing circuitry.

14. The circuit system of claim 13, wherein the second buffer circuit is a second first-in-first-out buffer circuit that stores the first write command and a third write command from the first agent in an order received from the arbitration and multiplexing circuitry, and wherein the third buffer circuit is a third first-in-first-out buffer circuit that stores the second write command and a fourth write command from the second agent in an order received from the arbitration and multiplexing circuitry.

15. A method for providing a write request to a host system, the method comprising:
generating write data and a write command for the write request at first logic circuitry;

storing the write data and the write command received from the first logic circuitry in second logic circuitry;

generating a write response at the host system in response to receiving the write command from the second logic circuitry;

providing the write response from the host system to the second logic circuitry; and providing the write data from the second logic circuitry to the host system in response to receiving the write response from the host system before providing the write response to the first logic circuitry.

16. The method of claim 15 further comprising:

performing a write operation at the host system using the write command and the write data received from the second logic circuitry, wherein the first logic circuitry is driven by a clock signal that has a frequency that is less than a frequency of a clock signal that drives the second logic circuitry.

17. The method of claim 15, wherein storing the write data and the write command received from the first logic circuitry in the second logic circuitry further comprises storing the write data in a first buffer circuit in the second logic circuitry, and wherein providing the write data from the second logic circuitry to the host system further comprises providing a signal indicative of receipt of the write response from a second buffer circuit in the second logic circuitry to the first buffer circuit, and providing the write data from the first buffer circuit to the host system in response to receiving the signal at the first buffer circuit.

18. The method of claim 15, wherein storing the write data and the write command received from the first logic circuitry in second logic circuitry further comprises:

providing the write data generated from a first agent and a first identifier of the first agent to a first buffer circuit with arbitration and multiplexing circuitry; and providing the write command and the first identifier to a second buffer circuit with the arbitration and multiplexing circuitry.

19. The method of claim 18 further comprising:

providing additional write data generated by a second agent for an additional write request and a second identifier of the second agent to the first buffer circuit with the arbitration and multiplexing circuitry; and providing an additional write command for the additional write request and the second identifier to a third buffer circuit with the arbitration and multiplexing circuitry.

20. The method of claim 15 further comprising:

storing the write response in the second logic circuitry;

providing the write response from the second logic circuitry to the first logic circuitry after providing the write data from the second logic circuitry to the host system; and storing the write response in the first logic circuitry.

* * * * *